(12) United States Patent
Kommula et al.

(10) Patent No.: US 10,892,994 B2
(45) Date of Patent: Jan. 12, 2021

(54) QUALITY OF SERVICE IN VIRTUAL SERVICE NETWORKS

(71) Applicant: VMWARE, INC., Palo Alto, CA (US)

(72) Inventors: Raja Kommula, Cupertino, CA (US); Jeremy Tidemann, Urbana, IL (US); Constantine Polychronopoulos, Palo Alto, CA (US); Marc Andre Bordeleau, Shawinigan (CA); Edward Choh, Richmond (CA); Ojas Gupta, Mountain View, CA (US); Robert Kidd, Champaign, IL (US); Georgios Oikonomou, Patras (GR)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/411,604

(22) Filed: May 14, 2019

(65) Prior Publication Data

US 2020/0366617 A1    Nov. 19, 2020

(51) Int. Cl.
*H04L 29/06*    (2006.01)
*H04L 12/851*    (2013.01)
*H04L 12/813*    (2013.01)
*H04L 12/947*    (2013.01)
*H04L 12/855*    (2013.01)
(Continued)

(52) U.S. Cl.
CPC .......... *H04L 47/2441* (2013.01); *H04L 47/20* (2013.01); *H04L 47/2433* (2013.01); *H04L 47/2466* (2013.01); *H04L 47/6225* (2013.01); *H04L 47/6245* (2013.01);
(Continued)

(58) Field of Classification Search
CPC ..... H04L 47/2441; H04L 49/25; H04L 69/22; H04L 47/6245; H04L 47/2466; H04L 47/2433; H04L 49/30; H04L 47/20; H04L 47/6225; G06F 9/00
See application file for complete search history.

(56) References Cited

U.S. PATENT DOCUMENTS

| 7,719,982 B2 | 5/2010 | Varma |
| 9,173,156 B2 | 10/2015 | Bai |

(Continued)

FOREIGN PATENT DOCUMENTS

| CN | 107277883 A | 10/2017 |
| CN | 108540384 | 9/2018 |

(Continued)

OTHER PUBLICATIONS

International Search Report and Written Opinion, International Application No. PCT/US2020/014661, dated May 18, 2020.
(Continued)

*Primary Examiner* — Mohamed A Kamara
(74) *Attorney, Agent, or Firm* — Clayton, McKay & Bailey, PC

(57) ABSTRACT

A switch in a slice-based network can be used to enforce quality of service ("QoS"). Agents can run in the switches, such as in the core of each switch. The switches can sort ingress packets into slice-specific ingress queues in a slice-based pool. The slices can have different QoS prioritizations. A switch-wide policing algorithm can move the slice-specific packets to egress interfaces. Then, one or more user-defined egress policing algorithms can prioritize which packets are sent out into the network first based on slice classifications.

20 Claims, 5 Drawing Sheets

(51) Int. Cl.
*H04L 12/863* (2013.01)
*H04L 12/935* (2013.01)

(52) U.S. Cl.
CPC .............. *H04L 49/25* (2013.01); *H04L 49/30* (2013.01); *H04L 69/22* (2013.01)

(56) References Cited

U.S. PATENT DOCUMENTS

| | | | |
|---|---|---|---|
| 9,722,935 | B2 | 8/2017 | Bouanen |
| 10,182,129 | B1 | 1/2019 | Peterson |
| 10,374,956 | B1 | 8/2019 | Tracy |
| 10,601,724 | B1* | 3/2020 | Filsfils ................ H04L 47/10 |
| 2008/0075002 | A1* | 3/2008 | Fourcand ............ H04L 49/9042 370/230 |
| 2010/0074113 | A1 | 3/2010 | Muramoto |
| 2012/0281528 | A1 | 11/2012 | Hong |
| 2013/0282893 | A1 | 10/2013 | Pearce |
| 2015/0029853 | A1 | 1/2015 | Raindel |
| 2015/0326448 | A1 | 11/2015 | Chaudhary |
| 2015/0326451 | A1 | 11/2015 | Rao |
| 2016/0048402 | A1 | 2/2016 | Tsirkin |
| 2016/0132798 | A1 | 5/2016 | Picard |
| 2016/0154660 | A1 | 6/2016 | Clark |
| 2016/0261495 | A1 | 9/2016 | Xia |
| 2016/0344565 | A1 | 11/2016 | Batz |
| 2016/0359872 | A1 | 12/2016 | Yadav |
| 2017/0214623 | A1 | 7/2017 | Finkelstein |
| 2017/0289270 | A1 | 10/2017 | Li |
| 2017/0346885 | A1 | 11/2017 | Jiang |
| 2018/0103091 | A1 | 4/2018 | Kwak |
| 2018/0131578 | A1 | 5/2018 | Cui |
| 2018/0131616 | A1 | 5/2018 | Laberge |
| 2018/0139129 | A1 | 5/2018 | Dowlatkhah |
| 2018/0152958 | A1 | 5/2018 | Arnold |
| 2018/0242161 | A1 | 8/2018 | Vulgarakis Feljan |
| 2018/0295180 | A1 | 10/2018 | Yang |
| 2018/0316608 | A1 | 11/2018 | Dowlatkhah |
| 2018/0316615 | A1 | 11/2018 | Shaw |
| 2018/0376338 | A1 | 12/2018 | Ashrafi |
| 2019/0014496 | A1 | 1/2019 | Kim |
| 2019/0028382 | A1 | 1/2019 | Kommula |
| 2019/0034220 | A1 | 1/2019 | Padmanabhan |
| 2019/0140904 | A1* | 5/2019 | Huang ................ H04L 41/0806 |
| 2019/0253962 | A1* | 8/2019 | Kiessling .............. H04W 76/10 |
| 2019/0281466 | A1* | 9/2019 | Zhang .................... H04L 41/12 |
| 2019/0319840 | A1 | 10/2019 | Cheng |
| 2019/0394132 | A1 | 12/2019 | Zhang |
| 2020/0029242 | A1* | 1/2020 | Andrews ............. H04W 72/087 |
| 2020/0068430 | A1 | 2/2020 | Chan |
| 2020/0099625 | A1 | 3/2020 | Yigit |
| 2020/0128445 | A1 | 4/2020 | Dong |
| 2020/0186411 | A1 | 6/2020 | Ravichandran |
| 2020/0221346 | A1 | 7/2020 | Park |

FOREIGN PATENT DOCUMENTS

| | | |
|---|---|---|
| KR | 1020180009046 | 1/2018 |
| WO | WO2016049332 | 3/2016 |
| WO | WO2018214506 | 11/2018 |
| WO | WO2018224151 | 12/2018 |

OTHER PUBLICATIONS

Gouareb, Racha, "Virtual Network Functions Routing and Placement for Edge Cloud Latency Minimization", IEEE Journal on Selected Areas in Communications (vol. 36, Issue 10), sections I-V, Sep. 24, 2018.

Samsung: "Idle mobility aspects to support network slicing", 3GP Draft; R2-1708083 Idle Mobility Aspects to Support Network Slicing, 3rd Generation Partnership Project (3GPP), Mobile Competence Centre; 650, Route Des Lucioles; F-06921 Sophia-Antipolis Cedex, vol. Ran WG2, No. Berlin, Germany Aug. 21, 2017-Aug. 25, 2017; Aug. 20, 2017.

International Search Report dated Jul. 16, 2020 for PCT/US2020/032769.

International Search Report dated Jul. 21, 2020 for PCT/US2020/032764.

International Search Report dated Jul. 22, 2020 for PCT/US2020/032768.

\* cited by examiner

QUALITY OF SERVICE IN VIRTUAL SERVICE NETWORKS

BACKGROUND

Today's 3G, 4G, and LTE networks operate using multiple data centers ("DCs") that can be distributed across clouds. These networks are centrally managed by only a few operating support systems ("OSSs") and network operations centers ("NOCs"). 5G technology will dramatically increase network connectivity for all sorts of devices that will need to connect to the Telco network and share the physical network resources. Current network architectures cannot scale to meet these demands.

Network slicing is a form of virtualization that allows multiple logical networks to run on top of a shared physical network infrastructure. A distributed cloud network can share network resources with various slices to allow different users, called tenants, to multiplex over a single physical infrastructure. For example, Internet of Things ("IoT") devices, mobile broadband devices, and low-latency vehicular devices will all need to share the 5G network. These different use cases will have different transmission characteristics and requirements. For example, the IoT will typically have a large number of devices but very low throughput. Mobile broadband will be the opposite, with each device transmitting and receiving high bandwidth content. Network slicing can allow the physical network to be partitioned at an end-to-end level to group traffic, isolate tenant traffic, and configure network resources at a macro level.

However, traditional approaches to Quality of Service ("QoS") are not scalable with regard to network slicing. Existing approaches do not account for slice-based classifications, marking, and policing. Marking involves modifying attributes of network traffic, and policing includes monitoring the traffic for compliance with a traffic contract. Moving this functionality to virtual network functions ("VNFs") of slices could overwhelm physical hardware. A physical host can only process so much data at once, and if thousands of VNFs on a host attempt to measure or enforce QoS the processing required can be overwhelming. Additionally, computation times can be in the nanoseconds on the physical layer, whereas they can take longer in the virtual layer.

Without a scalable way to enforce QoS, when the network infrastructure becomes overburdened, important traffic can be negatively impacted or prevented altogether. The network can be unworkable without reliable transmission of important traffic, such as 911 calls and communications to self-driving vehicles, among others. Tenants also negotiate for certain performance metrics in Software License Agreements ("SLAs") that cannot be reliably met without QoS.

As a result, a need exists for enforcing QoS in a virtual slice network ("VSN").

SUMMARY

Examples described herein include systems and methods for enforcing slice-based QoS in a VSN. The system can include a monitoring module that communicates with agents on physical switches, such as routers or servers. The agents can run in the physical layer of the switches, such as in the core of the switch. The switches can be programmed by the monitoring module or some other part of an orchestration topology to execute the agent. Packets of data can transmit using specific slices. The slices can be used to divide the network for purposes of accommodating different QoS classifications for one or more tenants. Each slice can have dedicated bandwidth. For example, a slice for emergency communications can be maintained such that these communications are routed effectively even when a different slice dedicated to video streaming experiences congestion.

The agent at each switch can analyze incoming packets and place them into ingress queues based on the slice identifier ("ID") that applies to the packet. For example, a first ingress queue can be maintained for a first slice, a second ingress queue for a second slice, and so on based on the number of slices defined at the switch. The switch can retrieve information in a packet header and compare it to a slice classification table to determine the slice ID. For example, source and destination addresses and ports can be used to determine which slice the packet belongs to. Future packets of the same flow (also called a stream) can be categorized into the same slice.

The switch then moves these packets from the ingress queues into egress queues corresponding to the egress interfaces. The egress interfaces can include one or more egress ports. The egress queues can correspond to the same slice classifications as the ingress queues. To determine an order for moving ingress packets to the egress queues, the switch can use a first policing algorithm. For example, the first policing algorithm can be first-in first-out ("FIFO"), regardless of slice. Alternatively, particular slice classifications can be prioritized, causing packets in the corresponding ingress queues to be addressed first relative to those with lower slice classifications.

The switch can then forward the packets from the egress queues at each egress interface to a next hop based on another policing algorithm. This policing algorithm can, for example, prioritize some slices over others, sending packets for the prioritized slices before packets for non-prioritized slices.

These stages can be performed by a switch that follows a method, in an example. The stages can be part of a system that includes, for example, a monitoring module that programs the switch to run the agent and carry out the stages. Alternatively, a non-transitory, computer-readable medium including instructions can cause a processor at the switch to perform the stages when the processor executes the instructions. The term "switch" can broadly refer to any device performing network functionality, such as a server, router, or host.

Both the foregoing general description and the following detailed description are exemplary and explanatory only and are not restrictive of the examples, as claimed.

DESCRIPTION OF THE EXAMPLES

Figure 1:
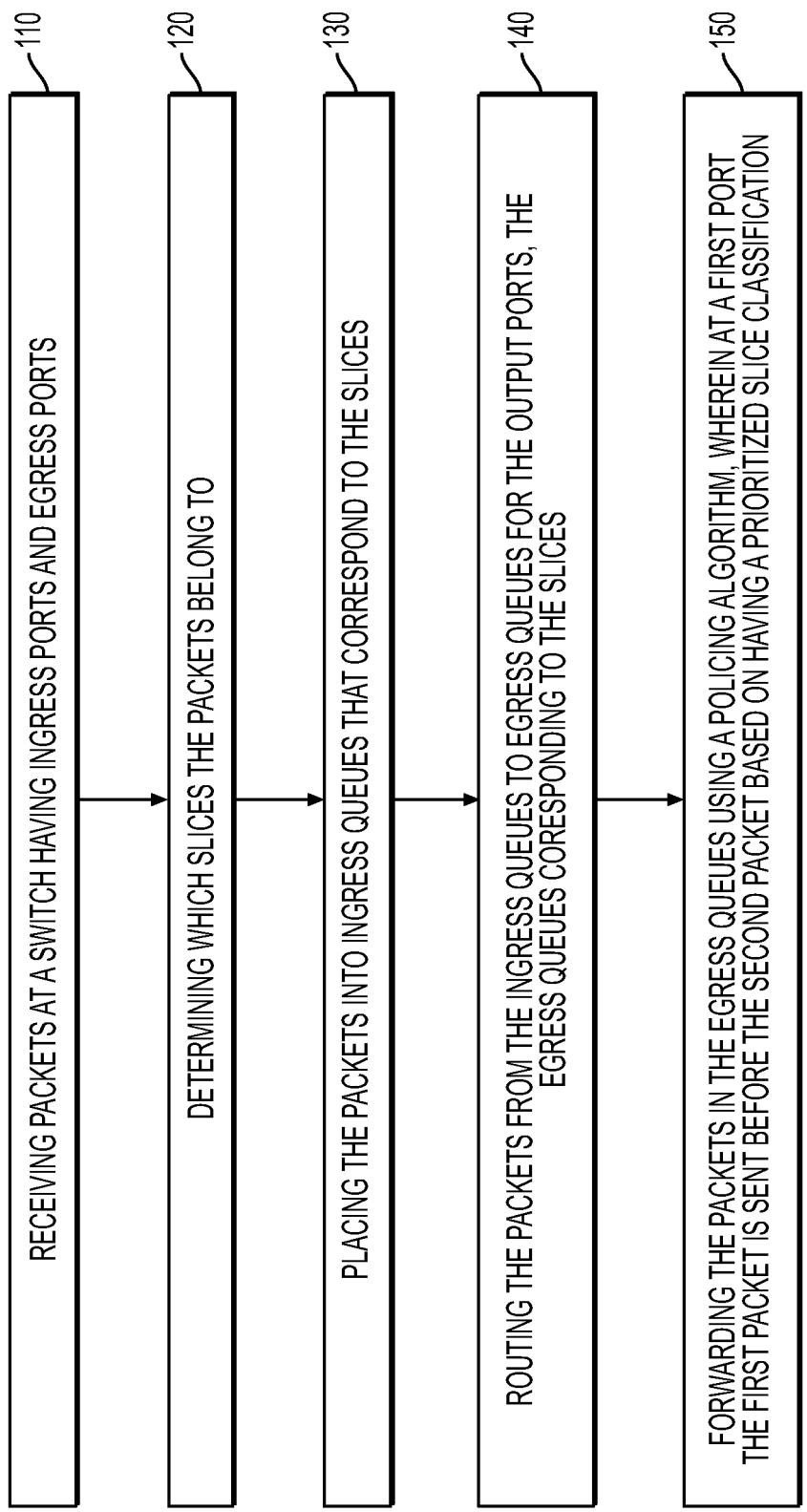
FIG. 1 is a flowchart of an example method for enforcing slice-based QoS in a VSN.

Reference will now be made in detail to the present examples, including examples illustrated in the accompanying drawings. Wherever possible, the same reference numbers will be used throughout the drawings to refer to the same or like parts.

In one example, a system includes multiple switches across one or more clusters or clouds in a VSN. An orchestrator can manage multiple slices within the network, which can be used for specific purposes or leased to tenants. For example, the slices can be reserved for particular applications, IoT devices, or customers. Each slice can be a virtual network that runs on top of a shared physical network infrastructure distributed across one or more Telco clouds. A slice can include a service chain of VNFs for performing certain network tasks. The required combination of VNFs can differ based on the intended use of the slice, such as video streaming or IoT device management.

Slices can be reserved for certain types of traffic and prioritized for QoS purposes. A service level agreement ("SLA") can define which performance metrics are required for the slice and can specify different QoS levels for different slices. The QoS and required performance metrics can vary between slices, depending on the intended use of a given slice. The SLA or a separate slice record can also specify which VNFs make up the service chain.

To instantiate the slice, the VNFs can be deployed across a slice path. The slice path can represent a subset of the provider's distributed network and can span one or more switches. Even when traffic is travelling to the same destination, different slices can route that traffic differently. The physical switches and VNFs can span different locations in the network, allowing slices to take different paths to the destination and effectively distributing workload across the network.

An orchestrator can determine a slice path based on telemetric data received from physical switches in the network. Telemetric data can include any information related to latency, throughput, or other performance characteristics specified in an SLA.

The physical switches can send the telemetric data to a monitoring module. The monitoring module can be part of the orchestrator or a separate process. The orchestrator and monitoring module can be hosted on a management cluster of servers, in an example. In one example, the physical switches are programmed to execute an agent that monitors packets at the hardware level. For example, the agent can run in the core of the switch rather than in a virtual layer where virtual machines execute. In another example, the switch can be a virtual switch. The agent can also report the telemetric data to the monitoring module.

The agent can cause the switch to determine which slice traffic corresponds to and enforce QoS policies on those slices. Multiple slice IDs can be accessible in a table at the switch, based on information available in a packet header of a packet. In one example, a slice selector can send this information to the switches upon detecting a new stream that is classified into a slice.

The monitoring module or a slice selector can provide the switches with slice paths that allow the switches to send the packets to different next hops, based on the slice. The next hop can be another switch for the slice path. This allows for prioritized slices to be configured across less-congested routes in the network. Based on packet prioritization within the switches and in slice path selection across the network, slice-based QoS can be enforced.

FIG. 1 is an example flow chart for enforcing slice-based QoS in a VSN. At stage 110, a switch can receive packets. The switch can be any hardware used in networking that has ingress and egress ports. For example, the switch can be a router. The ingress and egress ports can be part of ingress and egress interfaces, respectively. These interfaces can, in one example, operate based on a process that executes on the switch. For example, the switch can be programmed to route data according to slices and enforce policing algorithms on some or all of the data. In one example, the monitoring module or orchestrator can remotely program the switches to perform slice-specific actions. In one example, the switches include programmable networking application-specific integrated circuits ("ASICs"), such as the TOFINO chip, that can be programmed using the P4 language or some other protocol.

At stage 120, the switch can determine which slice a packet belongs to. This can include looking up a slice classification that is previously determined at a slice selector. Alternatively, the switch can make the classification if the traffic was not already classified by a slice selector, such as if the slice selector did not have enough information to classify the packet.

In one example, a slice selector at an ingress point in the service chain assigns a slice identifier to network traffic. The packets can include a slice identifier in the packet header. Classification of packets can be done based on a slice selection algorithm, which can run in both overlay (virtual) and underlay (physical) portions of the network. In one example, packets can be classified into slices based on packet information, such as packet type, source and destination IP address, source and destination ports, and source and destination MAC addresses. In one example, the slice selector initially processes the packets and assigns them to one of the network slices of the VSN. The slice selector can also handle service chaining operations to ensure that the packets are processed by the correct set of network services for the assigned slice. In various examples, the slice selector can be implemented by a virtual machine ("VM"), a software forwarding element (e.g., a flow-based forwarding element) operating within a VM or within virtualization software of a host computer, or a set of modules executing outside of a forwarding element (e.g., between a VM and a port of a forwarding element) within virtualization software of a host computer, among others.

In some cases, many slice selectors are configured to implement the VSN. In a telecommunications service provider example, a slice selector can be configured for each cell tower, base station, or other aspect of the access network. The telecommunications service provider access network can include edge clouds for each cell tower and configure at least one slice selector at each such edge cloud. In other examples (e.g., for SD-WAN traffic entirely contained within a set of connected datacenters), distributed network slice selectors are configured such that the network slice selection for a data message sent from a VM occurs at the same host computer as the source of the data message (though outside of the source VM).

Slice selection can be based on information in the packet header for a packet. For example, a switch or slice selector can use a combination of layer 2 to layer 4 (L2-L4) headers or by performing deep packet inspection (e.g., to classify traffic based on data in the layer 7 (L7) header. For example, slice selection can be based simply on the source device by using the source network layer (e.g., IP) address, or can be based on the type of traffic or destination network domain by looking at the L7 header. In some embodiments, the network slice selector maintains state for mapping connections to network slices so that deep packet inspection does not need to be performed on each data message of a connection. In addition, for some connections, only certain data messages contain the L7 header information required for performing the slice selection.

When performing slice selection using deep packet inspection, the initial data message for a connection may not include the L7 header information that the slice selector needs to correctly identify the slice. For example, a connection between an endpoint device (for example, a mobile device such as a smart phone or tablet, a laptop or desktop computer, an IoT device, a self-driving automobile, a smart camera belonging to a security system) and a network domain often begins with a set of connection initiation messages, such as a TCP handshake. After completion of the handshake, the device then sends, for example, an http get message that includes the network domain. Subsequent data messages sent between the device and the network domain may not include such information.

The slice selector can then send the packet information needed to identify the slice to the switches in the service chain. This can include sending a packet with this information through the service chain.

Armed with this information, at stage 120, the switch can determine which slice an incoming packet belongs to. A switch can be a physical piece of hardware that analyzes the incoming packet in an ingress interface and determines the slice to which the packet corresponds. An agent programmed into the switch can make the slice determination for the packet. The agent on the switch can do this based on the packet header information, which can uniquely identify the slice. In one example, the packet header includes information used to determine the slice, based on prior slice classification at a slice selector. For example, the switch can use the source and destination addresses and ports in the packet header to look up a slice identifier in a slice table at the switch.

The switch can also identify the slice based on determining a packet belongs to a stream that is already classified into a slice. A stream, also referred to as a flow, can be a channel of information, such as YOUTUBE video streaming from Miami, that uses a slice. By identifying the flow, the switch can place the packets from that stream into the same slice. For example, a unique stream can have an internet protocol identifier ("IP ID") in the header. Using this IP ID, the switch can be associated the packet with the same slice as a prior packet having that IP ID.

At stage 130, the switch can place the packets into the ingress queues of the slice-based pool based on each packet's slice classification. For example, the slice-based pool can contain a number of ingress queues corresponding to the number of different slices. A first ingress queue can correspond to a first slice ID, a second ingress queue can correspond to a second slice ID, and so on. These queues can allow packets to remain in sequence within a slice and also act as buffers while the switch routes packets to egress queues based on a load balancing algorithm (e.g., policing algorithm).

An agent running within the physical layer of the switch can place the packets into the slice-based ingress queues. The agent can be configured by an administrator or orchestrator in an example, and programmatically placed onto the switch. The agent can run in the core of the switch, in an example. The ingress queues can be defined by the agent or other user-defined programming. The ingress queues can be maintained within the physical layer of the switch.

At stage 140, the agent routes (switches) the packets from the ingress queues to one or more egress queues. A separate slice-based pool of egress queues can be maintained for each output interface of the switch. Each output interface can correspond to one or more egress ports. The egress queues can correspond to the same slice classifications as the ingress queues. In this way, at a first output interface, a set of N egress queues corresponding to N slice classifications can be maintained. At a second output interface, another set of N egress queues corresponding to N slice classifications can be maintained.

Each packet can be routed to an output interface (or egress port) that corresponds to the slice path for the slice ID of the packet. Slices can take different slice paths through the network, which can include switches at one or more clusters or clouds. Each slice can take different routes through the network. Within the switch, this can require placement of packets at different egress ports, based on the slice ID. However, slices do not necessarily take different paths. Traffic from multiple slices can use the same path and receive different queuing prioritizations at an output interface to achieve different SLA requirements based on traffic type.

To route the packets into the egress queues, the agent can utilize a policing algorithm. The policing algorithm can be selected or modified based on machine learning. Alternatively, some or all aspects of the policing algorithm can be user defined. In one example, the switch uses a FIFO algorithm, in which packets are routed to the egress queues in the order in which they are received in the slice-based pool. Alternatively, a slice round robin ("SRR") algorithm can be used, in which one packet from each slice is forwarded at a time. For example, the switch can take a packet from each slice-based ingress queue and route it to the appropriate interface into an egress queue for the same slice.

In another example, a slice-weighted round robin algorithm ("SWRR") is used. In SWRR, packets can be forwarded based on a weight of each slice. Slice weight can be calculated, in one example, according to Equation 1, below.

$$\text{Slice Weight} = (\text{Total Bandwidth}) * (\text{Slice Bandwidth}) / \Sigma(\text{Slice Bandwidth}) \quad \text{--Equation 1--}$$

As shown in Equation 1, slice weight can be based on the bandwidth of each slice relative to that of the other slices. The routing policing algorithm can be referred to as a switch-wide algorithm herein. Once a packet is selected based on the switch-wide algorithm, it is placed into a slice-specific egress queue at the egress interface based on the forwarding state of the switch.

At stage 150, the switch forwards the packets into the physical network from the egress queues according to another policing algorithm, called an egress policing algorithm. This egress policing algorithm can be programmed at the switch based on communications from the monitoring module. An orchestrator or other administrative user can select how to prioritize slice egress by defining or selecting between egress policing algorithms. The egress policing algorithm can be FIFO, SRR, or SWRR, depending on the example. In one example, the routing policing algorithm is FIFO, but the egress policing algorithm is SWRR. This can help enforce QoS by prioritizing egress of packets from prioritized slices.

In one example, the egress policing algorithm causes the switch to send out a first packet before a second packet based on a prioritized slice classification. For example, at a first egress interface, the first packet can have a first slice ID that is prioritized above the slice ID of a second packet. The first packet can be part of a slice dedicated to emergency communications, whereas the second packet can be dedicated to movie streaming.

Figure 2:
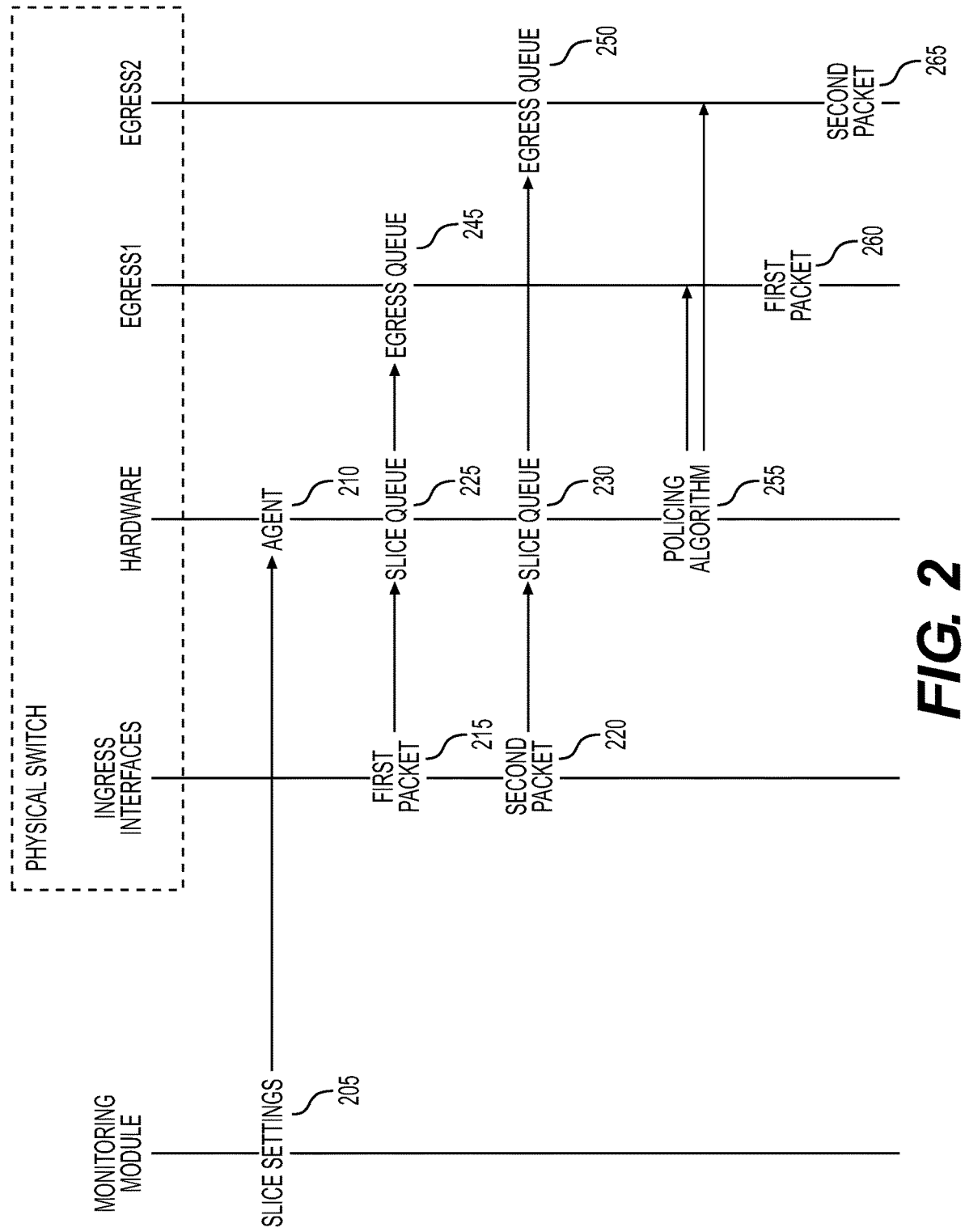
FIG. 2 is an example illustration of a sequence diagram for enforcing slice-based QoS in a VSN.

FIG. 2 is an example sequence diagram for slice-based QoS enforcement at an individual switch. A monitoring module can provide the switch with slice settings at stage 205. Slice settings can include information slice table information for routing slice traffic along corresponding slice paths. The slice settings can also include policing algorithms for prioritizing slices.

The monitoring module can include software installed on a server that is remote from the physical switch. In one example, the monitoring module can send a command to the switch, causing the switch to programmatically implement an agent at stage 210. The agent can execute on the switch hardware, in the physical layer rather than the virtual layer, in an example. The agent can analyze ingress packets and route them according to a slice.

At stage 215, a first packet can be received at an ingress interface of the switch. The first packet can include a header that specifies address and port information for use in routing by the switch. The first packet can also include a slice identifier, in an example. Alternatively, the switch can determine a slice identifier by using information in the packet header to retrieve a slice ID from a local table implemented on the switch. For example, the slice identifier can be retrieved, in one example, based on the source and destination internet protocol ("IP") addresses, ports, or media access control ("MAC") addresses. In one example, the slice ID is based on identifying a packet as part of a stream of data to which a previous packet with a known slice ID belongs.

Based on the slice ID, the agent can place the first packet into a slice-specific ingress queue at stage 225. A slice-based pool can contain multiple such queues, including one for each different slice ID. In another example, ingress queues can be shared by different slices.

Similarly, a second packet can arrive at the same or different ingress interface at stage 220. The agent can similarly identify or determine the slice ID that corresponds to the second packet. Based on the slice ID, the agent can place the second packet in the corresponding slice-specific ingress queue at stage 230.

The agent can then use a switch-wide algorithm to determine the order of placing the first and second packets into respective egress queues at stages 245 and 250. With a FIFO switch-wide algorithm, the first packet is placed into an egress queue at stage 245. In this example, the first packet is placed prior to the second packet at stage 250 since the first packet entered the slice-based pool before the second packet.

At stage 255, an egress policing algorithm can execute for one or more of the egress interfaces. In one example, the switch can be programmed to utilize different egress policing algorithms for different egress interfaces. In another example, a single egress policing algorithm is used for all slice-based egress interfaces.

The egress policing algorithm can be FIFO, SRR, SWRR, or some other custom algorithm. In one example, the egress policing algorithm is SWRR. The slices can be ranked according to or based on QoS priority, in an example. This can ensure that packets in an egress queue for a highest priority slice get prioritized over those in a low priority slice egress queue. The prioritization can be based on available bandwidth. For example, as overall bandwidth decreases, the relative prioritization given to the prioritized slice can increase. This can help maintain SLA performance levels for prioritized slices even when the switch is becoming overwhelmed. Similarly, the relative prioritization for a slice can decrease when available bandwidth on the switch increases. This can ensure that all slices maintain SLA performance levels when enough bandwidth exists on the switch to do so.

At stage 260, the switch can send the first packet to the next hop in the physical network. The next hop can be another switch. This can continue until the data meets the destination for the slice path, which can include an egress point into the internet at large, a particular server, or database.

In this example, the first packet is sent to its next hop at stage 260 prior to the second packet being sent to its next hop at stage 265. The order in which these packets are sent into the physical network can depend on the egress policing algorithm, in an example. Additionally, if the packets are being sent from two different egress interfaces, the order can depend on the relative load of the different egress interfaces. For example, one or more egress ports at a first egress interface may be busy with relatively long slice-based queues of data waiting for transmission, while a second egress interface can have less data waiting in its respective slice-based queues. In one example, a separate algorithm can balance the load of the different egress interfaces such that the full bandwidth of the switch is used efficiently.

Figure 3:
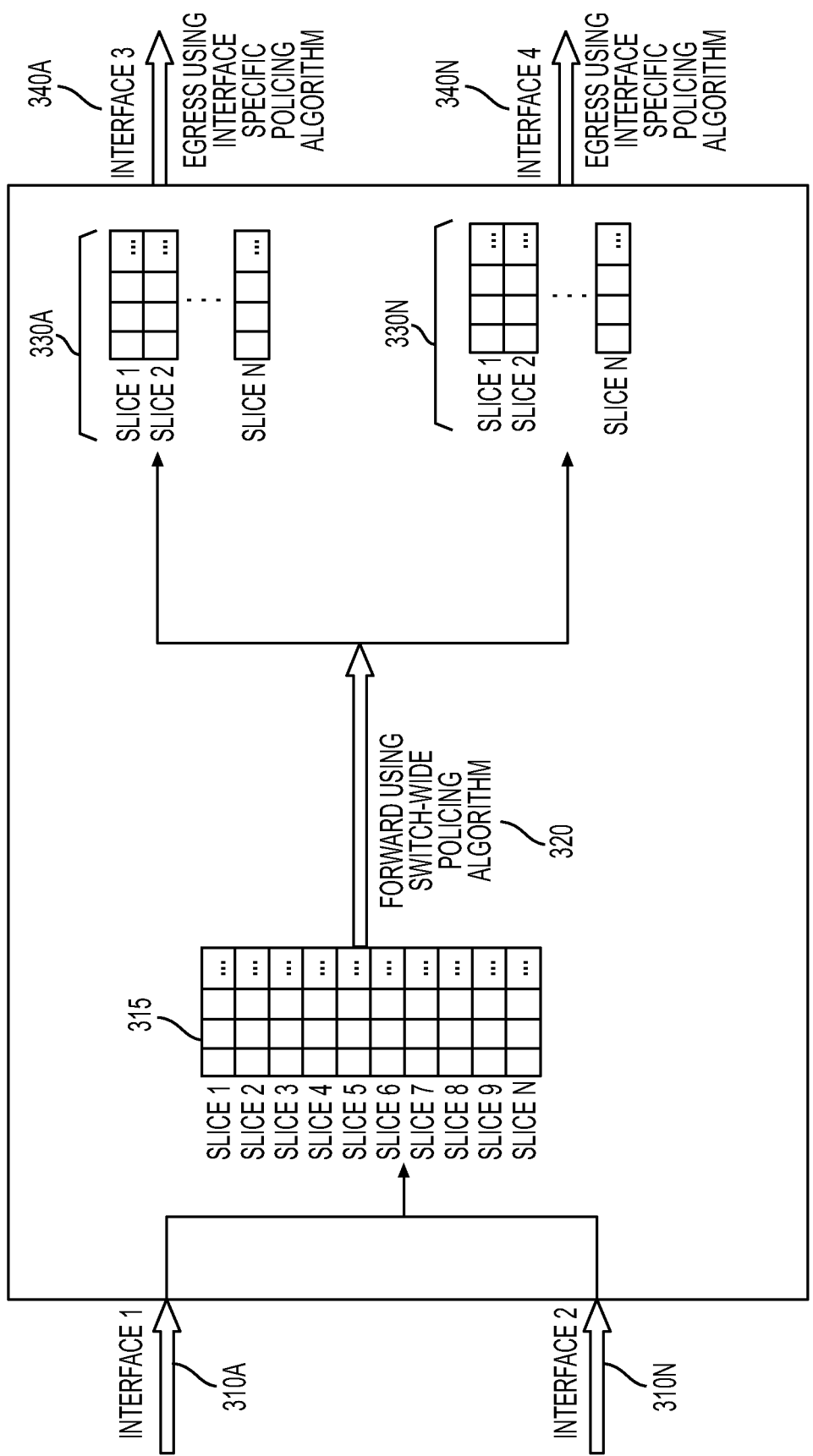
FIG. 3 is an example illustration of a switch that performs slice-based QoS.

FIG. 3 is an example illustration of a switch that enforces slice-based QoS. In this example, any number of ingress interfaces 310a, 310n can provide ingress ports into the switch. The agent on the switch can place the packets from these ingress interfaces 310a, 310n into a slice-based pool 315. The slice-based pool 315 can have N number of slice-specific ingress queues. In this example, ten such ingress queues exist, corresponding to Slice IDs one through ten.

Packets can be placed into these ingress queues based on their Slice IDs. Determining the slice ID can include retrieving that information from a packet header in one example. For example, Table 1 below shows an example slice table for mapping information from a packet header to a slice ID.

TABLE 1

| Src IP | Dst IP | Protocol | Src Port | Dst Port | Slice ID |
| --- | --- | --- | --- | --- | --- |
| IP1 | IP2 | TCP | 25 | 45 | 1 |
| IP1 | IP3 | TCP | 19 | 40 | 2 |
| IP4 | IP2 | TCP | 25 | 45 | 1 |
| IP5 | IP6 | ARP | 10 | 20 | 4 |

In this example, the source IP, destination IP, data protocol, source port, and destination port can be examined in the packet header and used to select the corresponding Slice ID. The slice table of Table 1 can be stored at the switch for determining which slice a packet corresponds to. In one example, the information in the slice table is provided to the switch by the monitoring module. Each entry in the table can represent a flow.

In another example, flows are more numerous than the rows of data in the slice table. Each flow can have a unique and dynamic IP ID. Storing the IP ID in the slice table can therefore be burdensome, in an example. Instead, the switch can track some number of recent IP IDs for recent flows, and how those flows have been mapped to slice IDs. This can allow the switch to determine which slice corresponds to a packet based on the stream (i.e., flow) that the packet belongs to. In that example, the switch can use the IP ID and avoid some amount of additional packet inspection, based on the correlation of the IP ID to a slice.

The information in Table 1 can be provided by a slice selector preceding the switch, which can classify data according to slice ID. The slice selector can be part of an ingress cluster where traffic enters the VSN, in an example. The slice selector can analyze address information and packet type and classify packets into slices. For example, a slice selector can use the information in Table 1 in the packet header to look up the slice ID in a local slice table. The slice table can be used to identify a slice ID based on a combination of host and destination IP address, host and destination port, host and destination MAC address, and packet type. The packet type can be, for example, transmission control protocol ("TCP"), internet control message protocol ("ICMP"), or address resolution protocol ("ARP"), among others. In another example, the switch can look up the slice ID in a local slice table based on some combination of this packet information. Additionally, different packet protocols can operate on their own slices, in an example, or have dedicated ingress or egress interfaces.

In one example, the slice selector can transmit an initial message on which the packet inspection was performed to the destination of the flow, such as the network domain, based on the selected slice. This can allow the slice selector and switch to store a state for assigning subsequent traffic to the same slice without performing deep packet inspection each time. This can include storing the address and port information in the slice table, as shown in FIG. 1. It can also include mapping flows to slices using, for example, IP ID.

Based on the slice ID, the packets can be queued in the slice-specific ingress queues of the slice-based pool 315. Then, a switch wide policing algorithm 320 can be used to route the packets from the sliced-based pool 315 to any number of egress interfaces 340*a*, 340*n*. The egress interface 340*a*, 340*n* for a particular packet can be chosen based on the next hop for that packet. Each slice can have a slice path that determines the next hop. The slice path information can be provided to the switch by the monitoring module and referenced at the switch as part of routing to the egress interfaces 340*a*, 340*n*. For example, a first packet can have a next hop that is accessible from a first egress interface 340*a*, and a different packet can have a next hop that is accessible from another egress interface 340*n*.

The switch-wide algorithm 320 can dictate the order in which the packets are routed from the slice-based pool 315 to the egress interfaces 340*a*, 340*n*. This can include prioritizing some slices over others.

Each egress interface 340*a*, 340*n* can have its own set of slice-specific egress queues 330*a*, 330*n*. These egress queues 330*a*, 330*n* can correspond to the same slices as the ingress queues of the slice-based pool 315. Therefore, if a packet in Slice 2 is being routed to egress interface 340*n*, it can be placed in an egress queue 330*n* specific to Slice 2.

From there, the packets can be sent into the physical network to their respective next hops based on an egress policing algorithm. An egress policing algorithm can run for each egress interface 330*a*, 330*n*, in an example. In one example, each egress port of an egress interface 330*a*, 330*n* is governed by a different egress policing algorithm. In another example, the egress ports of one or more egress interfaces 330*a*, 330*n* are treated as output channel governed by a common egress policing algorithm.

Figure 4:
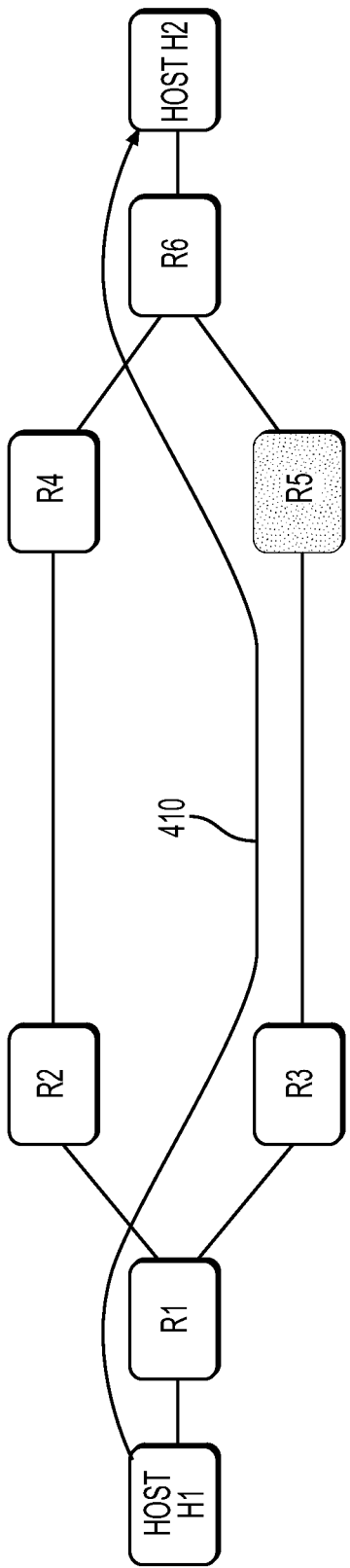
FIG. 4 is an example illustration of slice path.
Figure 5:
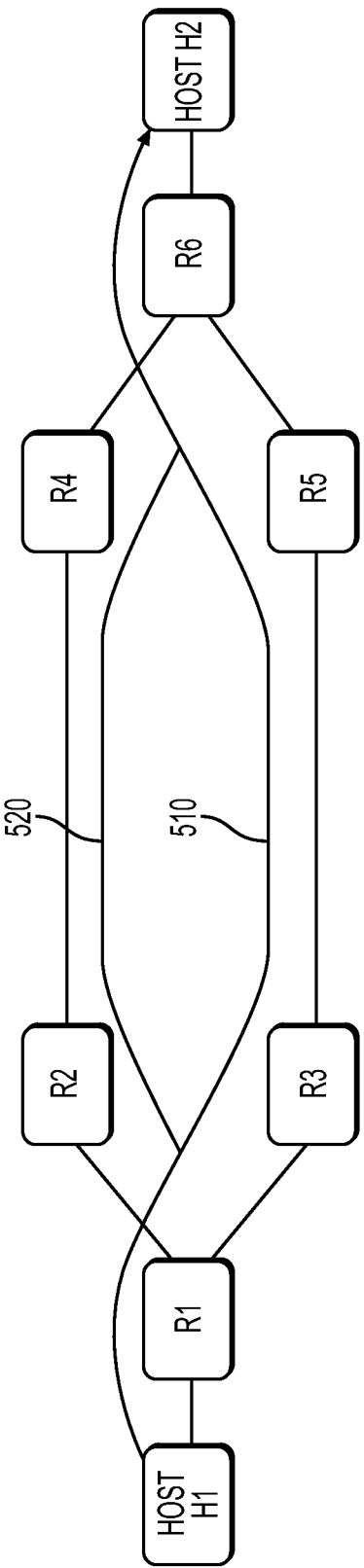
FIG. 5 is an example illustration of alternative slice paths.

FIGS. 4 and 5 illustrate example slice path routes through a network, which can include physical and virtual network components. In FIG. 4, a first slice 410 can route traffic from host H1 to host H2 through a slice path that spans switches R1, R3, R5, and R6. One or more of these switches can include VNFs that are part of the slice path in the virtual layer. The VNFs can include slice-specific functions. The illustrated switches R1-R6 can exist in the physical layer or, alternatively, be virtual switches in a virtual layer. These switches can be hardware devices, such as routers or servers. Similarly, hosts H1, H2 can be physical or virtual servers.

The monitoring module can track telemetric data from the various switches R1, R2, R3, R4, R5, and R6. For example, the switches can be programmed to execute the agent, which can periodically report slice-specific telemetric data. The monitoring module can compare the telemetric data to SLA requirements for a slice 410, in an example. The telemetric data can include performance attributes such as switch latency, slice latency, total round-trip time, slice bandwidth, and switch bandwidth.

In one example, the SLA comparison can be used to change the policing policies of a switch in an existing slice path. For example, if a slice 410 is failing to meet QoS according to an SLA, the monitoring module can dynamically adjust policing policies at a switch, such as switch R5, to bring the slice into compliance with the SLA. For example, the SLA comparison can indicate that slice 410 is experiencing too much latency at switch R5, while other slices at R5 meet QoS. In response, the monitoring module can change one or more of the policing algorithms or algorithm inputs to prioritize the first slice. In one example, the monitoring module can reprogram switch R5 by adjusting a slice prioritization weight value for the first slice. This weight value can be used in either the switch-wide policing algorithm or the egress policing algorithm of one or more egress interfaces. This can cause the switch R5 to prioritize the first slice and route packets in that slice quicker, which can bring the first slice back into compliance with QoS requirements of the SLA.

To avoid congestion and aid in QoS compliance with the SLA, slice paths can also be distributed differently across the network even when the source and destination addresses are the same. For example, in FIG. 5 a first slice 510 has a slice path that spans switches R1, R3, R5, and R6 and a second slice 520 has a slice path that spans switches R1, R2, R4, and R6. Compared to the single path of FIG. 4, this can alleviate congestion at a switch. For example, instead of having all slice traffic run through switch R5, one or more slices 520 can instead route traffic through switch R4.

To reroute the slice, the monitoring module can cause changes to both the physical and virtual layers of the network. For example, to cause the second slice 520 to take a different slice path than the first slice 510, an orchestrator process or the monitoring module can instantiate VNFs for the second slice in the virtual layer on top of switches R2 and R4. The monitoring module can send a message to switch R1 to provide a new slice path for the second slice 520, changing the next hop from R3 to R2. The monitoring module can also update switches R2 and R4 so that the respective next hops continue down the new slice path to R6.

Figure 6:
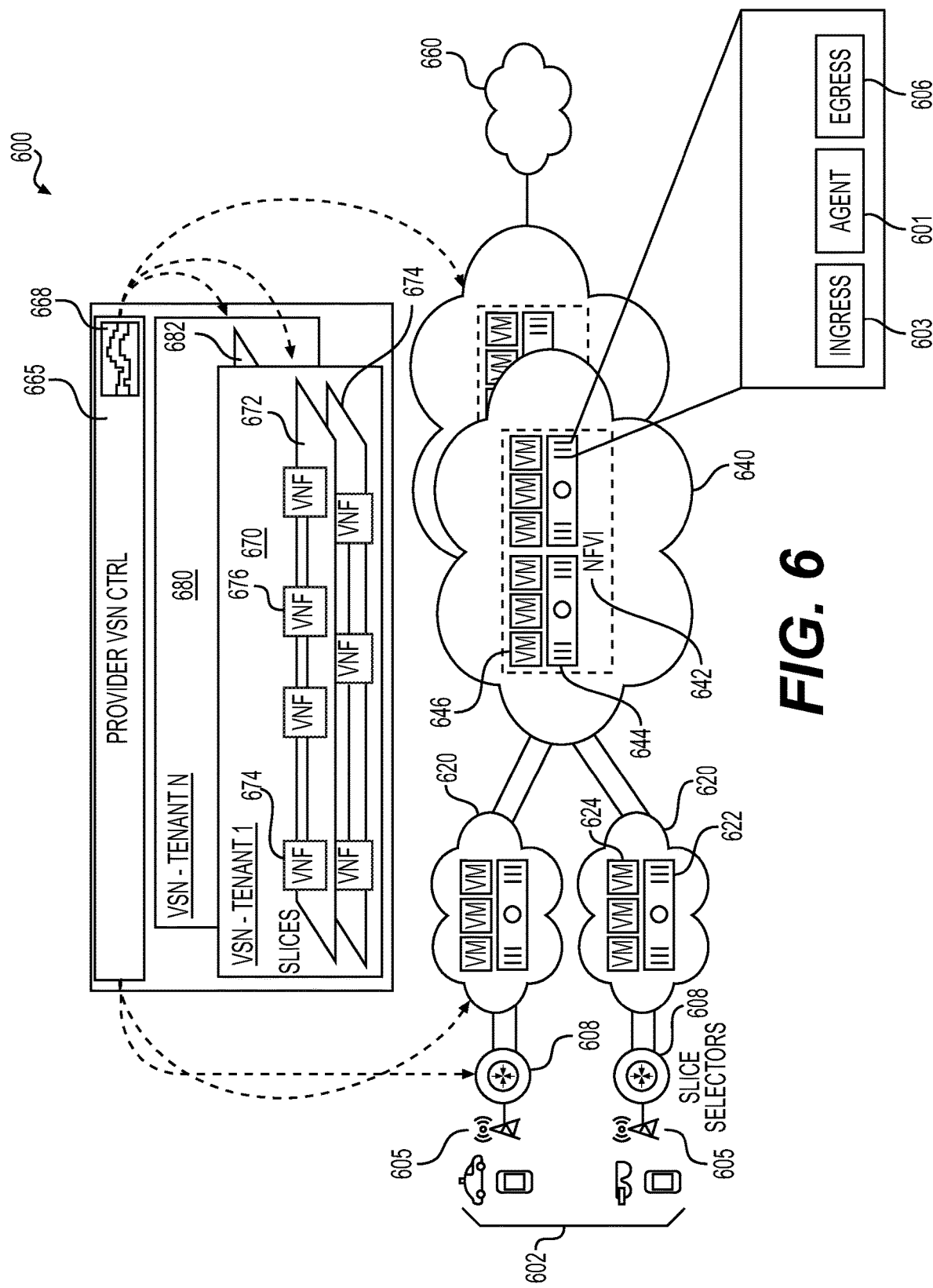
FIG. 6 is an example system diagram of a topology for a VSN.

FIG. 6 is an example diagram of system components in a VSN 600. The VSN 600 can be a distributed Telco cloud network with one or more clouds 620, 640. Slices 672, 678, 682 can be distributed across these clouds 620, 640.

Each cloud 620, 640 can have physical and virtual infrastructure for network function virtualization ("NFV") 642. For example, physical switches 644, such as routers and servers, can run VMs 646 or microservices that provide VNF functionality. A slice can include a first VNF that executes on an edge cloud 620. The VNF can utilize one or more vCPUs, which can be one or more VMs 624 in an example. However, the edge cloud 620 can execute numerous VNFs, often for multiple tenants where the VNFs are part of various slices. The slices can be kept separate from a functional perspective, with VNFs from different slices not aware of the existence of each other even when they rely on VMs 624 operating on shared physical hardware 622.

A first VNF in the slice path can communicate with a second VNF, which can be located in a different cloud 640. For example, the second VNF can include one or more VMs 646 operating on physical hardware 644 in a core cloud 640. The second VNF can communicate with yet another VNF in the slice path. One or more of these VNFs can act as an egress to the internet 660, in an example.

One or more user devices 602 can connect to a slice in the VSN 600 using, for example, a 5G data connection. The user devices 602 can be any physical processor-enabled device capable of connecting to a Telco network. Examples include cars, phones, laptops, tablets, IoT devices, virtual reality devices, and others. Cell towers 605 or other transceivers can send and receive transmissions with these user devices 602. At the ingress point to edge clouds 620, slice selectors 608 can receive data sent from the user devices 602 and determine which slice applies. The slice selectors 608 can operate as VMs 624 in the edge cloud or can run on different hardware connected to the edge cloud 620. The slice selectors can use information in the packet headers to determine which slice the packets belong to, in an example.

To manage the distributed virtual infrastructure, a provider can run a topology 665 of management processes, including an orchestrator 668 having a monitoring module. One example framework for these processes is VCLOUD NFV by VMWARE, which can use VSPHERE for network virtualization and VREALIZE for virtual analytics. An example orchestrator is CLOUDIFY. The orchestrator 668 can alternately communicate with a monitoring module that runs separately on a different server or in a different virtual environment. In that example, the monitoring module can be part of the topology 665 that works with the orchestrator 668.

The orchestrator 668 can be responsible for managing slices and VNFs, in an example. This can include provisioning new slices or re-provisioning existing slices based on performance metrics and network load. The orchestrator can run on one or more physical servers located in one or more core clouds 620, 640 or separate from the clouds. The orchestrator 668 can provide tools for keeping track of which clouds and VNFs are included in each slice. The orchestrator can further track slice performance for individual tenants 670, 680, and provide a management console. The orchestrator 668 can also receive performance metrics and load information and determine when the monitoring module should find a new slice path.

In this example, a first tenant 670 has multiple slices 672, 674. Each slice 672, 678 can be defined by a slice record that indicates VNF requirements for that slice. VNFs 674, 676 can each provide different functionality in the service chain.

In addition, an SLA can specify various threshold performance requirements for the slices. These performance requirements can include latency, round-trip time, bandwidth, and others. These can serve as per-slice QoS requirements, in an example.

The orchestrator 668 can rely on the monitoring module to receive telemetric information from the switches 622, 644 and determine if the SLA is satisfied. In one example, the monitoring module provides the switches 622, 644 with an agent 601. The switches 622, 644 can be programmed to execute the agent 601. The monitoring module can also supply policing algorithms that the switch uses to move packets from ingress ports 603 to egress ports 606, and from egress ports 606 to the next hop in the network 600. The monitoring module can also supply slice path information that the switches 622, 644 use to determine next hops and which egress interfaces (e.g., ports) to use for those next hops.

The orchestrator 668 can also change settings in the slice selectors 608 and switches 622, 644 to ensure traffic routes correctly down a slice path.

Although several examples above are discussed with regard to a physical switch, these examples can alternatively be performed at a virtual switch. Additionally, although the orchestrator, virtual management topology, and monitoring module are referred to separately, these processes can all operate together. The examples are not meant to limit which process performs which step. Instead, the monitoring module can be considered any portion of the virtual management topology that performs the described stages.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for enforcing Quality of Service ("QoS") in a Virtual Service Network ("VSN"), comprising:

defining, in a virtual layer, bandwidth values for each slice;

weighting a first slice based on its bandwidth value relative to the bandwidth values of the other slices;

receiving packets at a physical switch having ingress ports and egress ports;

placing the packets into a slice-based pool having ingress queues, the ingress queues each corresponding to a slice in the VSN, wherein an agent running on the physical switch places the packets into the ingress queues based on slice classifications of the packets, wherein a first packet is classified differently than a second packet;

routing the packets from the ingress queues to egress queues for the egress ports, the egress queues corresponding to the slices in the VSN; and forwarding the packets from the egress queues according to a policing algorithm, wherein the first packet is sent before the second packet based on having a prioritized slice classification, the prioritized slice classification being based on the weight of the first slice.

2. The method of claim 1, wherein the first packet is classified into a first slice corresponding to emergency calls and the second packet is classified into a second slice corresponding to internet-of-things devices.

3. The method of claim 1, wherein subsequent packets in a same stream as the first packet are classified into the same slice as the first packet based on being part of the same stream.

4. The method of claim 1, wherein placing the packets from the ingress queues into egress queues is done based on a first-in-first-out policy.

5. The method of claim 4, wherein the policing algorithm is a slice weighted round robin algorithm.

6. The method of claim 1, further comprising:
weighting a second slice based on its bandwidth value relative to the bandwidth values of the other slices; and
based on the weight of the first slice being greater than the weight of the second slice, sending the first packet before the second packet.

7. The method of claim 1, further comprising:
installing the agent at the physical switch, wherein the agent performs the slice classification based on packet header information including at least a source address, destination address, and destination port.

8. A non-transitory, computer-readable medium comprising instructions that, when executed by a processor, perform stages for enforcing Quality of Service ("QoS") in a Virtual Service Network ("VSN"), the stages comprising:
defining, in a virtual layer, bandwidth values for each slice;
weighting a first slice based on its bandwidth value relative to the bandwidth values of the other slices;
receiving packets at a physical switch having ingress ports and egress ports;
placing the packets into a slice-based pool having ingress queues, the ingress queues each corresponding to a slice in the VSN, wherein an agent running on the physical switch places the packets into the ingress queues based on slice classifications of the packets, wherein a first packet is classified differently than a second packet;
routing the packets from the ingress queues to egress queues for the egress ports, the egress queues corresponding to the slices in the VSN; and
forwarding the packets from the egress queues according to a policing algorithm, wherein the first packet is sent before the second packet based on having a prioritized slice classification, the prioritized slice classification being based on the weight of the first slice.

9. The non-transitory, computer-readable medium of claim 8, wherein the first packet is classified into a first slice corresponding to emergency calls and the second packet is classified into a second slice corresponding to internet-of-things devices.

10. The non-transitory, computer-readable medium of claim 8, wherein subsequent packets in a same stream as the first packet are classified into the same slice as the first packet based on being part of the same stream.

11. The non-transitory, computer-readable medium of claim 8, wherein placing the packets from the ingress queues into egress queues is done based on a first-in-first-out policy.

12. The non-transitory, computer-readable medium of claim 11, wherein the policing algorithm is a slice weighted round robin algorithm.

13. The non-transitory, computer-readable medium of claim 8, the stages further comprising:
weighting a second slice based on its bandwidth value relative to the bandwidth values of the other slices; and
based on the weight of the first slice being greater than the weight of the second slice, sending the first packet before the second packet.

14. The non-transitory, computer-readable medium of claim 8, the stages further comprising:
installing the agent at the physical switch, wherein the agent performs the slice classification based on packet header information including at least a source address, destination address, and destination port.

15. A system for enforcing Quality of Service ("QoS") in a Virtual Service Network ("VSN"), comprising:
a non-transitory, computer-readable medium containing instructions; and
a processor that executes the instructions to perform stages comprising:
defining, in a virtual layer, bandwidth values for each slice;
weighting a first slice based on its bandwidth value relative to the bandwidth values of the other slices;
receiving packets at a physical switch having ingress ports and egress ports;
placing the packets into a slice-based pool having ingress queues, the ingress queues each corresponding to a slice in the VSN, wherein an agent running on the physical switch places the packets into the ingress queues based on slice classifications of the packets, wherein a first packet is classified differently than a second packet;
routing the packets from the ingress queues to egress queues for the egress ports, the egress queues corresponding to the slices in the VSN; and
forwarding the packets from the egress queues according to a policing algorithm, wherein the first packet is sent before the second packet based on having a prioritized slice classification, the prioritized slice classification being based on the weight of the first slice.

16. The system of claim 15, wherein the first packet is classified into a first slice corresponding to emergency calls and the second packet is classified into a second slice corresponding to internet-of-things devices.

17. The system of claim 15, wherein subsequent packets in a same stream as the first packet are classified into the same slice as the first packet based on being part of the same stream.

18. The system of claim 15, wherein placing the packets from the ingress queues into egress queues is done based on a first-in-first-out policy.

19. The system of claim 18, wherein the policing algorithm is a slice weighted round robin algorithm.

20. The system of claim 15, the stages further comprising:
weighting a second slice based on its bandwidth value relative to the bandwidth values of the other slices; and
based on the weight of the first slice being greater than the weight of the second slice, sending the first packet before the second packet.

* * * * *